US008867587B2

(12) United States Patent
Zhang et al.

(10) Patent No.: US 8,867,587 B2
(45) Date of Patent: Oct. 21, 2014

(54) DOUBLE-LAYER MULTI-CARRIER ULTRA-WIDEBAND WIRELESS COMMUNICATION METHOD

(75) Inventors: Zaichen Zhang, Nanjing (CN); Jian Dang, Nanjing (CN); Xiaoyan Wang, Nanjing (CN); Guangguo Bi, Nanjing (CN); Xutao Yu, Nanjing (CN)

(73) Assignee: Southeast University, Jiangsu (CN)

( * ) Notice: Subject to any disclaimer, the term of this patent is extended or adjusted under 35 U.S.C. 154(b) by 93 days.

(21) Appl. No.: 13/511,993

(22) PCT Filed: Dec. 29, 2009

(86) PCT No.: PCT/CN2009/076185
§ 371 (c)(1),
(2), (4) Date: May 24, 2012

(87) PCT Pub. No.: WO2011/063575
PCT Pub. Date: Jun. 3, 2011

(65) Prior Publication Data
US 2012/0269234 A1    Oct. 25, 2012

(30) Foreign Application Priority Data
Nov. 24, 2009   (CN) .......................... 2009 1 0234400

(51) Int. Cl.
*H04B 1/00*   (2006.01)

(52) U.S. Cl.
USPC ....................................................... 375/130

(58) Field of Classification Search
USPC ....................................................... 375/130
See application file for complete search history.

(56) References Cited

U.S. PATENT DOCUMENTS

| 2005/0094709 | A1* | 5/2005 | Lakkis | 375/130 |
| 2009/0310699 | A1* | 12/2009 | Kodama et al. | 375/267 |
| 2010/0322334 | A1* | 12/2010 | Wang et al. | 375/267 |

FOREIGN PATENT DOCUMENTS

| CN | 1753399 A | 3/2006 |
| CN | 101145828 A | 3/2008 |
| CN | 101572683 A | 11/2009 |
| WO | WO 2009/113007 A2 | 9/2009 |

OTHER PUBLICATIONS

International Search Report, dated Aug. 19, 2010, corresponding to PCT/CN2009/076185, 3 pages.

* cited by examiner

*Primary Examiner* — Tanmay Shah
(74) *Attorney, Agent, or Firm* — Christie, Parker & Hale, LLP (57) ABSTRACT

The present invention is a double-layer multi-carrier ultra-wideband wireless communication method, wherein the frequency band for ultra-wideband communication is divided into a plurality of sub-bands, then one or more sub-bands are used for data transmission, and the Orthogonal Frequency Division Multiplex (OFDM) multi-carrier transmission technology is used in each sub-band. In the transmitting party, the data symbols to be transmitted are allocated on M branches corresponding to the M sub-bands, and the OFDM modulation is implemented on the data symbols on each branch to obtain M branches of parallel data, then digital baseband multi-carrier modulation is implemented on the M branches of parallel data. Thereby, the spectrum of data on each branch is moved onto the digital sub-band corresponding to the radio sub-band one to one, so the digital baseband signal of the radio signal to be transmitted is obtained. Then, the digital signal is converted to an analog signal with a D/A conversion and an up-conversion, and the signal spectrum is moved to the radio frequency band in use, then the analog signal is amplified, filtered and transmitted via an antenna, thus the task of modulating M branches of parallel data onto M sub-bands is completed.

4 Claims, 8 Drawing Sheets

DOUBLE-LAYER MULTI-CARRIER ULTRA-WIDEBAND WIRELESS COMMUNICATION METHOD

CROSS-REFERENCE TO RELATED APPLICATION(S)

This application is a National Phase Patent Application and claims priority to and benefit of International Application Number PCT/CN2009/076185, filed on Dec. 29, 2009, which claims priority to and benefit of Chinese Patent Application Number 200910234400.8, filed on Nov. 24, 2009, the entire disclosure of which are incorporated herein by reference.

TECHNICAL FIELD

The present invention relates to a method for realizing carrier-system high-speed ultra-wideband wireless communication, in particular to a double-layer multi-carrier ultra-wideband wireless communication method, and belongs to the technical field of short-distance wireless communication and information transmission.

BACKGROUND ART

Great importance is attached to the ultra-wideband technology, and the extensive research on ultra-wideband technology is carried out due to its advantages of high speed rate, low power consumption and the like. The current ultra-wideband system mainly has two realization systems, namely pulse system and carrier system, wherein the carrier-system ultra-wideband technology develops faster; and the technology standard based on MB-OFDM (Multi Band Orthogonal Frequency Division Multiplexing) scheme has already been established internationally, and various experimental chips and systems have been launched. In the current carrier system scheme, an ultra-wideband frequency spectrum is divided into a plurality of sub-frequency bands which are not overlapped with one another, data can only be sent on one sub-frequency band each time, in this way, the current spare frequency spectrum resources cannot be fully and flexibly used; moreover, a plurality of up-converters with different carrier frequencies are required, therefore the radio-frequency cost is increased; or a frequency synthesizer is used, but the time for switching between sub-frequency bands is increased. For the purpose of fully utilizing the frequency spectrum resources while suppressing the out-of-band radiation, a shaping filter with large stopband attenuation and very narrow transition bandwidth is required. But such filter has a very high order, thus not only the design difficulty and the system cost are increased, but also the system time delay is increased.

CONTENTS OF THE INVENTION

Technical Problems

The embodiments of the invention aim to provide a double-layer multi-carrier ultra-wideband wireless communication method, which realizes carrier-system high-speed ultra-wideband wireless communication, and solves the problems of requirement of many analog up-converters, inflexible band switching, inadequacy and inflexibility in use of frequency spectrum, and high order of the shaping filter in the existing carrier-system ultra-wideband technology.

Technical Scheme

Figure 1:
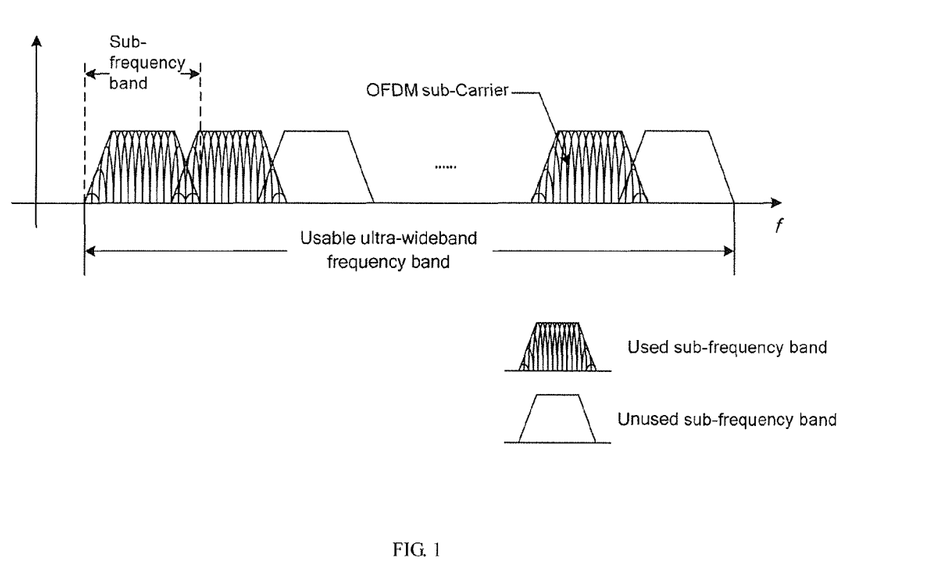
FIG. 1 is a schematic diagram for frequency band division and use of the present invention.

The embodiments of the present invention realize an ultra-wideband wireless communication system through double-layer multi-carrier. The double-layer multi-carrier ultra-wideband wireless communication method adopts a novel ultra-wideband frequency band division and use method, and the frequency band for ultra-wideband communication is divided into a plurality of sub-frequency bands, meanwhile one or more sub-frequency bands are used for data transmission, wherein the Orthogonal Frequency Division Multiplex multi-carrier transmission technology is used in each sub-frequency band. A schematic diagram for frequency band division and use of the double-layer multi-carrier ultra-wideband wireless communication method is shown in FIG. 1.

In the description of the present invention, the bandwidths of all sub-frequency bands are set to be identical, a point-to-point communication system is adopted, all the sub-frequency bands are used, data transmitted on each sub-frequency band are different, but based on double-layer multi-carrier, different sub-frequency band widths are set, or a multi-user communication system is constituted, or part of the sub-frequency bands are used for transmission, or same information is transmitted on a plurality of sub-frequency bands so as to obtain diversity gain, and other methods are all applicable to the present invention.

At a transmitting end, data symbols to be transmitted are allocated on M branches corresponding to M sub-frequency bands, and OFDM modulation is performed for the data symbols on each branch to obtain M branches of parallel data; then digital baseband multi-carrier modulation is performed for the M branches of parallel data. In this way, frequency spectrums of data on each branch are moved to digital sub-frequency bands which are in one-to-one correspondence to radio-frequency sub-frequency bands, so that digital baseband signals of radio-frequency signals to be transmitted are obtained; and then the digital signals are converted into analog signals through digital-to-analog (D/A) conversion and up-conversion, signal frequency spectrums are moved to the used radio-frequency ranges, and the analog signals are amplified, filtered and transmitted via an antenna, therefore the task of modulating the M branches of parallel data onto the M sub-frequency bands is completed.

In the description of the present invention, the task of modulating the M branches of parallel data onto the M sub-frequency bands is completed through the following steps: firstly generating the digital baseband signals of the radio-frequency signals to be transmitted containing all the sub-frequency bands; and then the digital baseband signals being subjected to D/A conversion and single up-conversion. However, the method of directly carrying out D/A conversion for the data which have been subjected to OFDM modulation and transmitting the data through respective up-conversion (requiring a plurality of up-converters with different carrier frequencies) is also applicable to the present invention.

At a receiving end, the signals are subjected to down-conversion and analog-to-digital (A/D) conversion so as to generate digital baseband signals which are synthesized through the data on the M sub-frequency bands; multi-carrier demodulation is performed for the baseband signals, so that frequency spectrums of each sub-frequency band data are moved onto respective basebands to obtain the M branches of parallel data; and then OFDM demodulation, equalization and detection are conducted for each branch of data, and all branches of data are combined into one branch of data, that is, the data symbols corresponding to the transmitting end are recovered.

Figure 2:
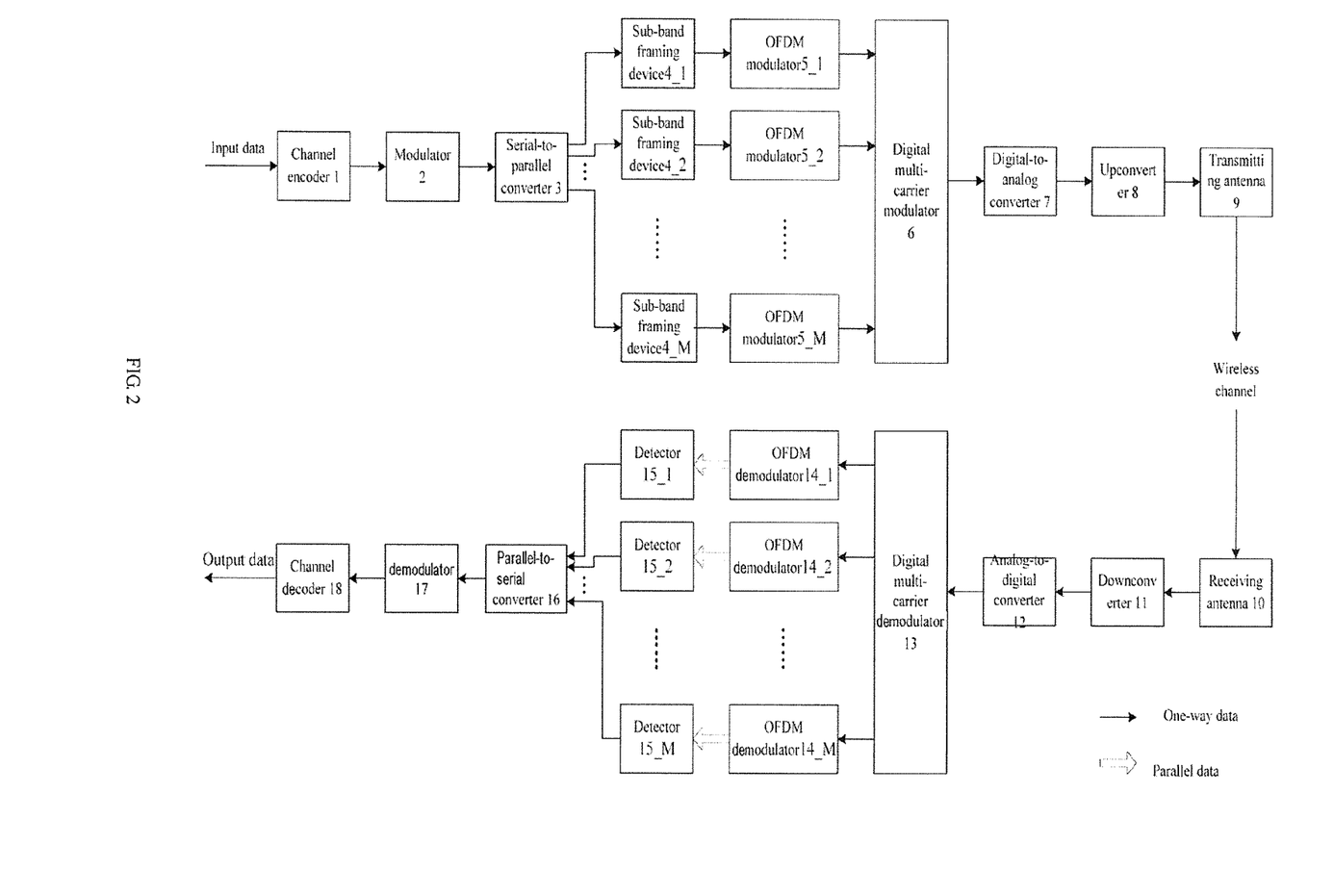
FIG. 2 is an overall structure block diagram of the system of the present invention.

As shown in FIG. 2, the transmitting end comprises a channel encoder, a modulator, a serial-to-parallel converter, sub-band framing devices, OFDM modulators, a digital baseband multi-carrier modulator, a digital-to-analog converter, an up-converter, a transmitting antenna and the like which are connected in sequence; and the receiving end comprises a receiving antenna, a down-converter, an analog-to-digital converter, a digital baseband multi-carrier demodulator, OFDM demodulators, detectors, a parallel-to-serial converter, a demodulator, a channel decoder and the like which are connected in sequence.

Redundant information is added in the input data by the channel encoder at the transmitting end shown in FIG. 2 so as to improve the transmission reliability, wherein various encoding modes with various code rates such as convolutional code, Turbo code, LDPC code and the like can be selected according to the needs; constellation symbol mapping is carried out for the coded bit data by the modulator to obtain modulation symbols, wherein various modulation modes such as M-PAM, M-PSK, M-QAM and the like can be selected according to the needs; the modulation symbols are allocated to the M branches by the serial-to-parallel converter; data streams in the branches are divided into groups as per certain format by the sub-band framing devices according to parameters of the OFDM modulator and parameters of the adopted digital baseband multi-carrier modulator, and synchronizing symbols, channel estimation symbols, frame header information symbols and the like are added to form frames of the branches; OFDM modulation is performed for the frames by the OFDM modulator and specifically comprises serial-to-parallel conversion, IFFT (Inverse Fast Fourier Transform), cyclic prefix addition, parallel-to-serial conversion, etc.; the symbols which have been subjected to OFDM modulation are re-modulated to corresponding digital sub-frequency bands by the digital baseband multi-carrier modulator, and multiple branches of data are combined by the digital baseband multi-carrier modulator into one branch of digital baseband signals of the radio-frequency signals to be transmitted; the digital signals are converted into corresponding analog signals by the digital-to-analog converter; and the baseband analog signals are moved to radio-frequency ranges to be used by the up-converter and then are amplified, filtered and transmitted via the antenna.

Down-conversion is carried out for receiving signals by the down-converter of the receiving end shown in FIG. 2 to obtain analog baseband signals; the analog signals are sampled and quantified by the analog-to-digital converter to obtain the digital baseband signals; data positioned on each digital sub-frequency band are moved onto respective basebands by the digital baseband multi-carrier demodulator; OFDM demodulation is performed for data on each branch by the OFDM demodulator and specifically comprises serial-to-parallel conversion, cyclic prefix removal, FFT (Fast Fourier Transform), etc.; parallel data which have been subjected to OFDM demodulation are equalized and detected by the detectors so as to eliminate the influence on the channel and the interference among sub-frequency bands; multiple branches of detected data are combined and are then demodulated by the demodulator, that is, constellation points are mapped into bit streams; and finally, channel decoding is carried out for the above-mentioned bit streams by the channel decoder so as to recover the initial input bit.

Figure 3:
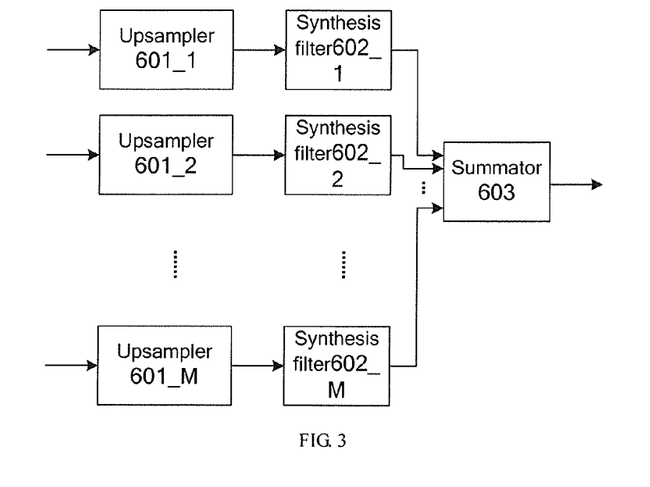
FIG. 3 is a structure block diagram of the digital baseband multi-carrier modulator.

As shown in FIG. 3, the digital baseband multi-carrier modulator is realized by adopting a synthesis filter bank which comprises M up-samplers, M digital bandpass filters (called as synthesis filters) and summator, wherein M is the number of sub-frequency bands, and the divisions of frequency ranges occupied by pass bands and transition bands of the digital bandpass filters are in one-to-one correspondence to the divisions of the sub-frequency bands in radio-frequency bands; and the digital baseband multi-carrier modulation specifically comprises the following steps: firstly, performing up-sampling for each branch of data which have been subjected to OFDM modulation, i.e. inserting a plurality of zeros between two adjacent data symbols, thereby compressing frequency spectrums of the original signals and generating a series of mirror image frequency spectrums; then, passing the up-sampled data through the digital bandpass filters of the respective branches, and reserving frequency spectrums positioned in the digital sub-frequency bands corresponding to the respective branches; and finally, summarizing the M branches of data and synthesizing into digital baseband signals of the radio-frequency signals to be transmitted. The digital bandpass filters are used for reserving the mirror image frequency spectrums positioned in the digital sub-frequency bands corresponding to the respective branches on one hand, and are used for limiting the ranges of the frequency spectrums within the digital sub-frequency bands on the other hand, so as to ensure that the frequency spectrum ranges are limited within the corresponding sub-frequency bands after digital-to-analog conversion and up-conversion.

Figure 4:
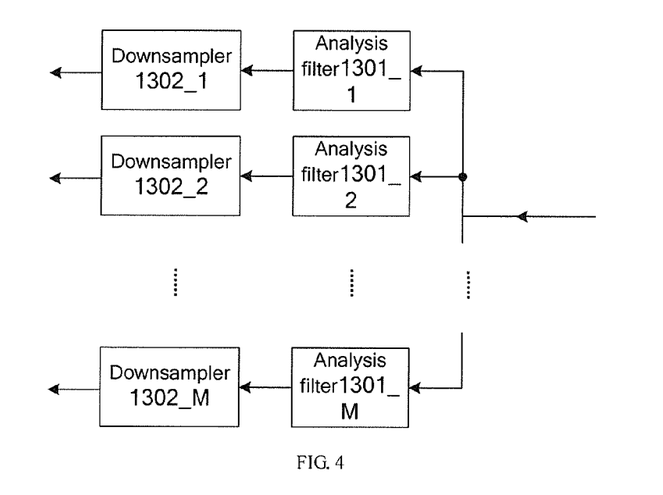
FIG. 4 is a structure block diagram of the digital baseband multi-carrier demodulator.

As shown in FIG. 4, the digital baseband multi-carrier demodulator is realized by adopting an analysis filter bank, and the analysis filter bank comprises M digital bandpass filters (called as analysis filters) and M down-samplers, wherein M is the number of sub-frequency bands, and the frequency ranges of pass bands and transition bands of the above-mentioned digital bandpass filters are identical with those of the filters on the corresponding branches in the synthesis filter bank; and the digital baseband multi-carrier demodulation specifically comprises the following steps: firstly, respectively passing the data which have been subjected to analog-to-digital conversion through the M digital bandpass filters to obtain M branches of parallel data streams; and performing down-sampling for each branch of data stream to obtain digital baseband signals of the data received by each sub-frequency band.

The parallel data which have been subjected to OFDM demodulation are equalized and detected by the detectors so as to eliminate the influence on the channel and the interference among the sub-frequency bands; a single-tap frequency domain equalizer based on the zero-forcing (ZF) criterion or the least mean square error (LMSE) criterion is adopted for equalization, so as to eliminate non-ideal properties of the channel, wherein the channel refers to an equivalent channel from the output of the digital baseband multi-carrier modulator to the input of the digital baseband multi-carrier demodulator; and the equalizer can adopt an equalizer with fixed tap coefficient or an adaptive equalizer. According to the description of the present invention, the adaptive equalizer is adopted. However, the equalizer with fixed tap coefficient is also applicable to the method provided by the invention.

Beneficial Effects

According to the double-layer multi-carrier ultra-wideband wireless communication method provided by the invention, data are modulated to the corresponding sub-frequency bands through a digital method, and compared with the traditional MB-OFDM ultra-wideband system, only an up-converter with fixed carrier frequency is required for the transmitting end and the receiving end respectively in the method provided by the invention, therefore the complexity of radio frequency is reduced, and the cost is reduced. Meanwhile, the division and the use of sub-frequency bands in the double-layer multi-carrier system are more flexible than those of the traditional MB-OFDM ultra-wideband system; therefore the frequency spectrum resources can be more fully utilized. In addition, the joint use, selection and switching of the sub-frequency bands in the double-layer multi-carrier system are realized in digital domains, thus the flexibility and the configurability of the system are improved, and meanwhile the reliability is enhanced.

Frequency bands of all the filters in the adopted digital baseband multi-carrier modulator are in one-to-one correspondence to radio-frequency sub-frequency bands, and after the digital baseband multi-carrier modulation of the data which have been subjected to OFDM modulation, the frequency spectrum ranges are constrained by frequency responses of the corresponding filters; and actually, the task of suppressing out-of-band radiation is completed, therefore a high-order filter is not required to constrain out-of-band frequency spectrum, and the complexity and the system time delay are reduced. In Example 2, the adopted frequency band division method enables the frequency responses of two adjacent filters to be half-overlapped, which makes the transition band of the filters very wide, therefore the stopband attenuation is very large, the order is very low, and the design requirements of the filters are reduced.

EMBODIMENTS

Two embodiments of the present invention are provided as follows which are used for illustrating the present invention rather than limiting the scope of the present invention.

Example 1

The example, in combination with FIG. 2, is used for elaborating an embodiment of the transmitting end and the receiving end of an ultra-wideband wireless communication method with the double-layer multi-carrier characteristic.

Figure 5:
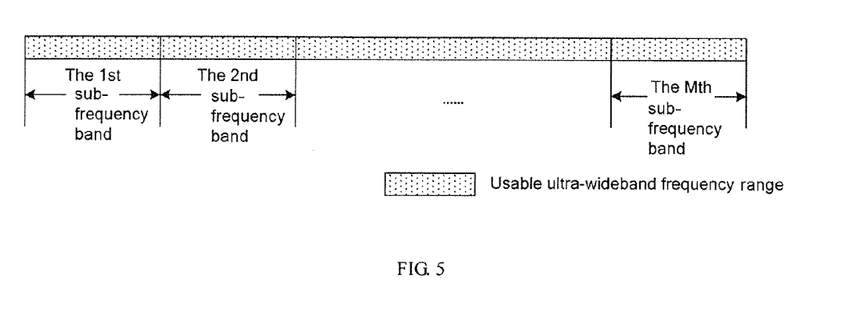
FIG. 5 is a schematic diagram of the frequency band division method in Example 1.

Firstly, the division of usable frequency bands of an ultra-wideband is described:

6-9 GHz is one of the frequency ranges which can be used for the ultra-wideband and can be divided into a plurality of mutually non-overlapped sub-frequency bands, as shown in FIG. 5. In the embodiment, the fixed sub-frequency band width is $W_{sub}$=528 MHz. In order to give a simplified description, only the first six sub-frequency bands are selected as the frequency ranges to be used, the total bandwidth is $W_{total}$=$W_{sub}$*6=3.168 GHz, and the center frequency is $f_c$=6 GHz+3.168 GHz/2=7.584 GHz.

The overall structure block diagram of the system is shown in FIG. 2. Since the division and the use of the frequency ranges in the system are closely related with the digital baseband multi-carrier modulator and the digital baseband multi-carrier demodulator, the used digital baseband multi-carrier modulator (the synthesis filter bank) and the digital baseband multi-carrier demodulator (the analysis filter bank) are firstly described.

Figure 6:
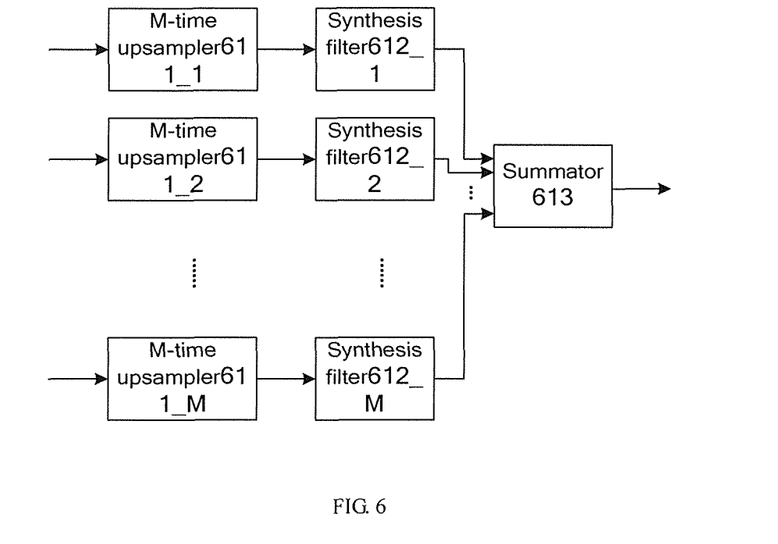
FIG. 6 is a block diagram of the digital baseband multi-carrier modulator in Example 1.
Figure 7:
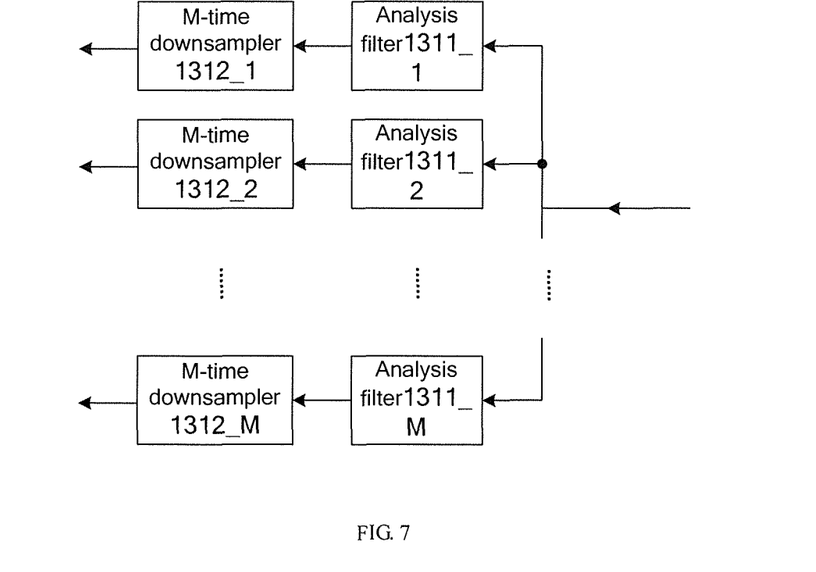
FIG. 7 is a block diagram of the digital baseband multi-carrier demodulator in Example 1.
Figure 8:
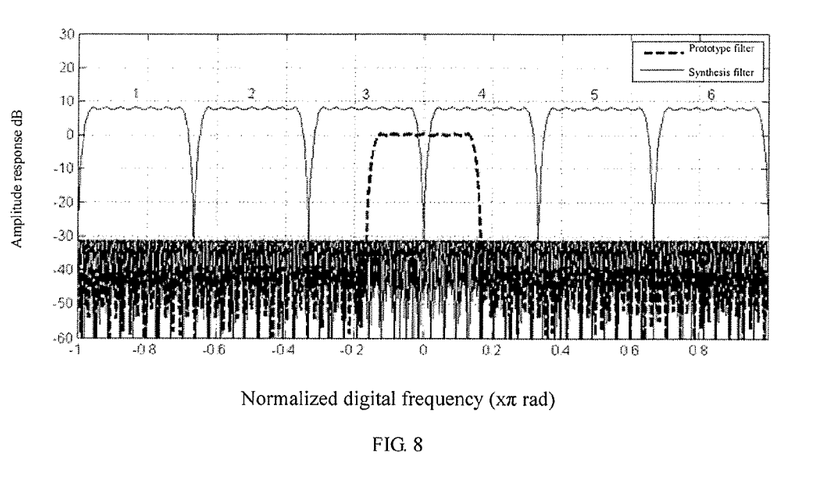
FIG. 8 is a figure of amplitude-frequency responses of each synthesis filter and the prototype lowpass filter in Example 1.

The specific structure of the digital baseband multi-carrier modulator 6 in FIG. 2 is shown in FIG. 6, wherein it comprises M M-time up-samplers 611_n, M synthesis filters 612_n and a summator 613, wherein the M-time up-samplers are used for improving the symbol sampling rate by M times by inserting M−1 zeros between two adjacent input symbols. The structure of the digital baseband multi-carrier demodulator 13 in FIG. 2 is shown in FIG. 7, wherein it comprises M analysis filters 1311_n and M M-time down-samplers 1312_n, wherein the M-time down-samplers are used for decreasing the symbol sampling rate by M times by taking out a symbol every other M input symbols. The time domain expressions of the synthesis filter in the $k_{th}$ branch and the analysis filter in the $k_{th}$ branch are as follows:

$$f_k(n) = \sqrt{M}\, h_p(n)\exp\left[j\frac{2\pi}{M}\left(k - \frac{M+1}{2}\right)n\right], n = 0, 1, \ldots, N_f - 1,$$

$$h_k(n) = \sqrt{M}\, h_p(N_f - 1 - n)\exp\left[-j\frac{2\pi}{M}\left(k - \frac{M+1}{2}\right)(N_f - 1 - n)\right]$$

$$n = 0, 1, \ldots, N_f - 1,$$

wherein, k=1, . . . , M, $f_k(n)$ indicates the impulse response of the synthesis filter in the $k_{th}$ branch, and the length of the impulse response is $N_f$; $h_k(n)$ indicates the impulse response of the analysis filter in the $k_{th}$ branch, and the length of the impulse response is $N_f$; and $h_p(n)$, indicates a prototype lowpass filter wherein n=0, 1, . . . , $N_f$−1, and the length is $N_f$. All the synthesis filters and the analysis filters are obtained through the exponential modulation on the prototype filter; seen from the frequency domain, uniform shift is conducted for the frequency response of the prototype filter, and the shift rule is to enable the frequency response distribution of all the synthesis (analysis) filters to be in one-to-one correspondence to the divided sub-frequency bands of the used frequency band, which means that, in the present embodiment, there are six synthesis (analysis) filters, i.e. M=6. The amplitude-frequency responses of the prototype filter and the synthesis filters adopted herein are shown in FIG. 8, wherein, by taking the length of the prototype lowpass filter as $N_f$=99, the amplitude-frequency responses of the analysis filters are identical with the amplitude-frequency responses of the corresponding synthesis filters; as can be seen from the figure, the frequency responses of adjacent filters are not overlapped, the transition bands are very steep, and the stopband attenuation of each filter is approximately −40 dB, therefore no interference exists between two adjacent sub-frequency bands. The sampling frequencies of all filters are fixed as $f_s=W_{total}=3.168$ GHz, the carrier frequencies of the up-converter 8 and the down-converter 11 in FIG. 2 are fixed as $f_{mix}=f_c=7.584$ GHz, therefore signals from the digital baseband multi-carrier modulator 6 in FIG. 2 are moved onto an ultra-wideband frequency band to be used after being subjected to digital-to-analog conversion and up-conversion, wherein the frequency spectrum of an output signal of the $k_{th}$ (k=1, 2, ..., M) synthesis filter is to be moved onto the $k_{th}$ sub-frequency band. The receiving end is similar to the transmitting end, wherein the signal frequency spectrum on the $k_{th}$ sub-frequency band is to be taken out by the $k_{th}$ analysis filter after being subjected to down-conversion. It can be known from the description above that if a certain sub-frequency band is to be used, all that is needed is to send data into the corresponding synthesis filter, and there is no need to change the carrier frequency of the up-converter, therefore the configuration and the switching of the sub-frequency bands are completed in the digital domains and are very flexible; moreover, only a converter with fixed carrier frequency is respectively required at the transmitting end and the receiving end. Compared with multiple converters or frequency synthesizers required by the traditional MB-OFDM ultra-wideband system, the radio-frequency cost is greatly reduced, and the time delay in frequency band switching is eliminated.

Redundant information is added into input data to perform encoding by the channel encoder 1 at the transmitting end shown in FIG. 2 so as to improve the transmission reliability, and various encoding modes with various code rates such as convolutional code, Turbo code, LDPC code and the like can be selected. In the embodiment, the convolutional code with a constraint length of 7 is adopted, and the encoding rate can be selected from the values such as ⅓, ½, ⅝, ¾ and etc. according to the related index requirements.

Constellation point mapping is conducted for coded bit by the modulator 2 to obtain modulation symbols, wherein, M-PSK, M-QAM and other modulation modes can be adopted according to the related index requirements. QPSK modulation is adopted in the present embodiment.

The modulation symbols are allocated to each branch by the serial-to-parallel converter 3, and no data will be allocated onto the corresponding branches if certain sub-frequency bands are not used; it is assumed here that all the sub-frequency bands are used, one branch of serial data stream is converted into M(=6) branch of parallel data stream by the serial-to-parallel converter 3.

Data of each branch are divided into groups as per certain format by each branch of framing device 4_*n* according to parameters of the OFDM modulation and parameters of the adopted filter banks, and synchronizing symbol sequences, channel estimation symbol sequences, frame header information symbol sequences and the like are added to form frames. Therefore, in order to illustrate the framing devices 4_*n* in details, the parameters of the OFDM modulator should be first illustrated.

OFDM modulation is performed for each frame data in respective branches by the OFDM modulators 5_*n* and comprises serial-to-parallel conversion, IFFT operation, cyclic prefix addition, parallel-to-serial conversion, etc. In the present embodiment, the number of sub-carriers of OFDM is taken as N=128, and the lengths of cyclic prefixes are taken as $N_{cyc}=37$ sample values. As the edge signals on all the sub-frequency bands have low power and greatly influenced by noises, a certain amount of null sub-carriers are required, wherein the number of the null sub-carriers is taken as $N_{null}=5$, i.e., no data symbol is placed on the 1st-3rd OFDM sub-carriers and the 127th-128th OFDM sub-carriers.

It is assumed that each frame on each branch comprises $K_{data}$ data OFDM symbols, wherein $K_{data}=100$, therefore $(N-N_{null})*K_{data}=12300$ modulation symbols are firstly selected by the framing devices 4_*n* and are divided into $K_{data}=100$ groups, each group comprises $N-N_{null}=123$ modulation symbols, and then 3 zeros and 2 zeros are respectively inserted at both ends of each group of symbols. After data arrangement, a plurality of synchronizing symbols, channel estimation symbols and frame header information symbols are required to be inserted in the front of data sequences by the framing devices 4_*n*, and the selection of the synchronizing and the channel estimation symbol sequences shall make the peak-to-average ratio of time domain data which have been subjected to OFDM modulation to be as small as possible. The length of one frame output by the final framing device 4_*n* is $(K_{sync}+K_{est}+K_{header}+K_{data})*N$, wherein $K_{sync}$, $K_{est}$, $K_{header}$ and $K_{data}$ are respectively the numbers of OFDM symbols contained in the synchronizing sequences, channel estimation sequences, frame header information sequences and data sequences.

Symbols obtained through OFDM modulation of each frame data are modulated again by the digital baseband multi-carrier modulator 6, so that all branches of baseband data are modulated onto the corresponding digital sub-frequency bands and are combined together to obtain digital baseband signals of the entire radio-frequency band signal. Digital signals are converted into analog baseband signals by the digital-to-analog converter 7; and the analog baseband signals are moved onto the ultra-wideband radio-frequency range to be used by the up-converter 8 and are sent via the antenna 9; therefore, sending signals with double-layer carrier are obtained.

Signals from the air are received by the receiving antenna 10 at the receiving end in FIG. 2, and radio-frequency signals are moved onto the baseband through the down-converter 11 and are then converted into digital baseband signals through the analog-to-digital converter 12.

The abovementioned baseband signals are decomposed by the digital baseband multi-carrier demodulator 13, and signals corresponding to the sub-frequency bands are taken out and converted into the baseband with lower sampling rate through down-sampling, so as to obtain multi-branch baseband signals corresponding to the transmitting end, wherein each branch of signals contains all information corresponding to signals of the transmitting end and meanwhile is influenced by the equivalent channel.

OFDM demodulation is carried out for each branch of baseband signals through the OFDM demodulators 14_*n* and specifically comprises serial-to-parallel conversion, cyclic prefix removal, FFT operation, etc.

Figure 9:
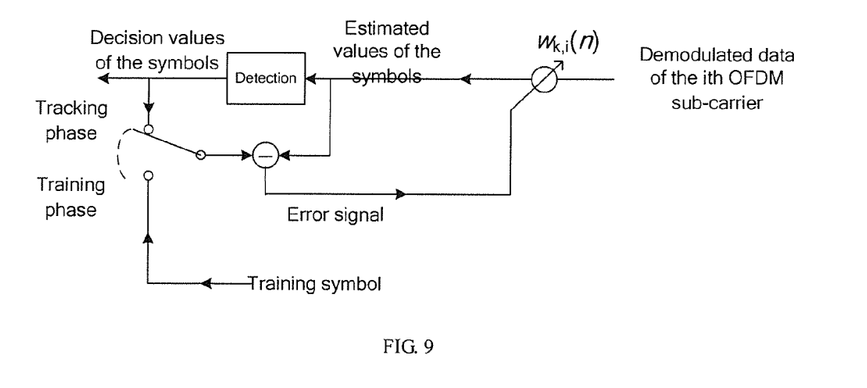
FIG. 9 is a structure block diagram of the adaptive equalizer used in the $k_{th}$ branch in Example 1.

The detectors 15_*n* are used for equalizing and detecting data subjected to OFDM demodulation so as to obtain estimated values of the modulation symbols at the transmitting end. There are many design schemes for the equalizer. An LMS adaptive equalizer based on the least mean square error criterion is adopted in the present embodiment, but the equalization methods adopting other adaptive algorithms are also applicable to the present invention. The function of equalization is to compensate non-ideal channel response. The use of OFDM enables a frequency selective fading channel to be converted into a plurality of flat fading channels, therefore the channel influence can be eliminated by using a single-tap equalizer. The specific structure of the detector used for estimating and detecting an initial input symbol on the $i_{th}$ sub-carrier in a certain OFDM frequency domain symbol on the $k_{th}$ (k=1, 2, ..., 12) branch is shown in FIG. 9, wherein i=4, 5, ... 126, indicating the serial number of the sub-carrier. $w_{k,i}(n)$ indicates the coefficient of the equalizer used for demodulated data on the $i_{th}$ OFDM sub-carrier in the $n_{th}$ OFDM symbol period on the $k_{th}$ branch. The detectors 21_n are composed of N−$N_{null}$=123 abovementioned structures, and the detected symbols are output in a serial mode.

For the detected data, multiple branches of data are combined into one branch through the parallel-to-serial converter 16, and are sent to the demodulator 17 to conduct symbol demodulation, and finally the initial input data are recovered through the channel decoder 18.

Compared with the traditional ultra-wideband system, the present embodiment has the advantages as follows:
1) Very high speed rate can be achieved which is directly proportional to the used band width. If six sub-frequency bands are all used and the convolutional code with r=½ code rate and the QPSK modulation are adopted, without consideration of the null sub-carriers, the cyclic prefixes and the frame header information sequences, the information transmission rate is approximately $R_{bits}$=r*(log$_2$4)*M*fs/M=fs=3.168 Gbps;
2) Only a converter is respectively used at the transmitting end and the receiving end, therefore the radio-frequency complexity is reduced;
3) The configuration and the switching of the sub-frequency bands are both completed in the digital domains, and the use of the frequency bands is flexible;
4) Frequency spectrum constraint is automatically completed during multi-carrier modulation, and a shaping filter is not needed any longer.

In order to make the stopband attenuation large enough and the transition bands narrow enough, the synthesis filters and the analysis filters used in the present embodiment require higher order.

Example 2

The present example, in combination with FIG. 2, is used to illustrate another embodiment of the transmitting end and the receiving end of the double-layer multi-carrier ultra-wideband wireless communication method, and is mainly different from the example 1 in the division method of sub-frequency band. In the example 2, overlapping between adjacent sub-frequency bands is allowed, thereby the design of the overall system may have many changes.

Figure 10:
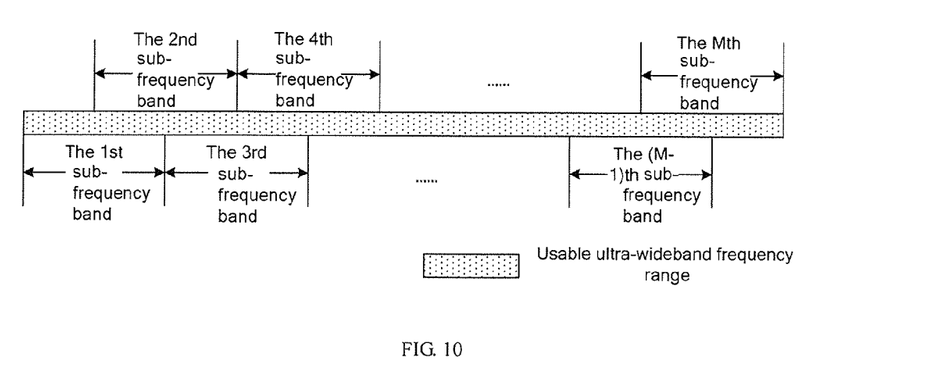
FIG. 10 is a schematic diagram of the frequency band division method in Example 2.

Firstly, the division of usable frequency bands of the ultra-wideband is described:

6-9 GHz is one of the frequency ranges which can be used for the ultra-wideband and can be divided into a plurality of mutually overlapped sub-frequency bands, as shown in FIG. 10. In the present embodiment, the sub-frequency bands have a fixed width $W_{sub}$=528 MHz. For simplified illustration, only the first 12 sub-frequency bands are selected as the frequency ranges to be used, the total bandwidth is $W_{total}$=$W_{sub}$*12/2=3.168 GHz, and the center frequency is $f_c$=6 GHz+3.168 GHz/2=7.584 GHz.

The overall structure block diagram of the system is shown in FIG. 2. Since the division and the use of the frequency ranges in the system are closely related with the digital baseband multi-carrier modulator and the digital baseband multi-carrier demodulator, the adopted digital baseband multi-carrier modulator (the synthesis filter bank) and the digital baseband multi-carrier demodulator (the analysis filter bank) are first described here.

Figure 11:
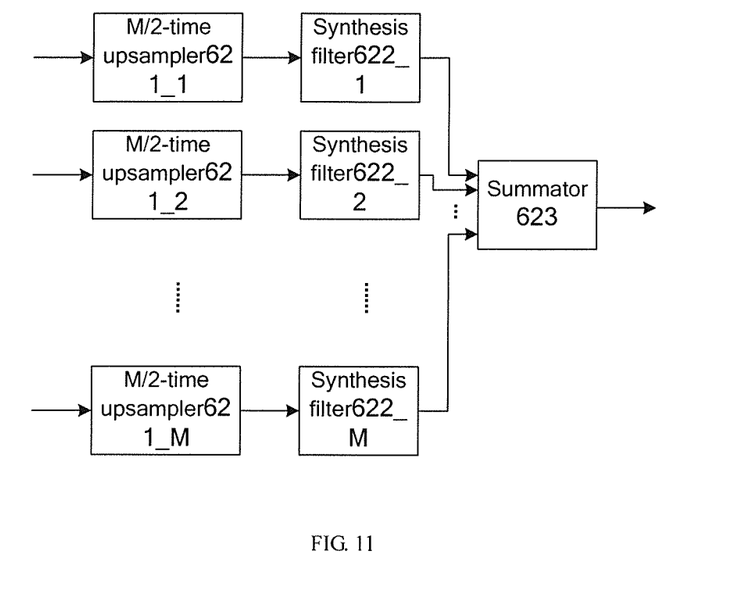
FIG. 11 is a block diagram of the digital baseband multi-carrier modulator in Example 2.
Figure 12:
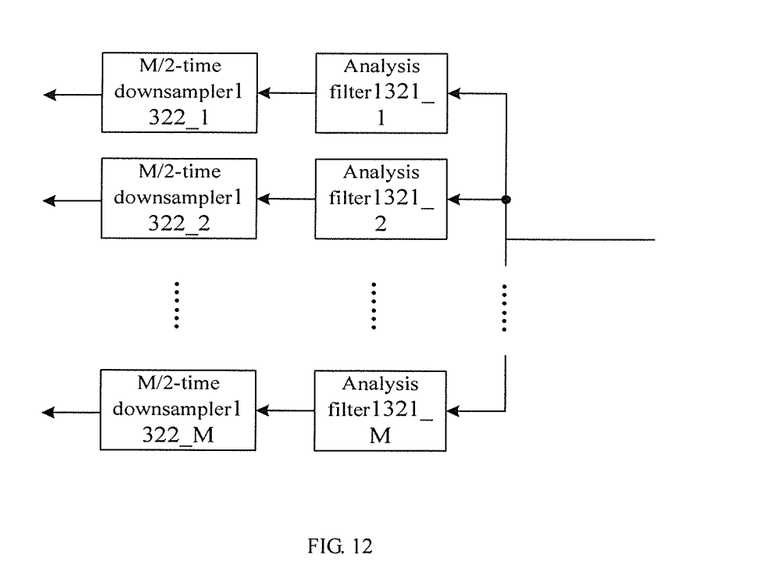
FIG. 12 is a block diagram of the digital baseband multi-carrier demodulator in Example 2.
Figure 13:
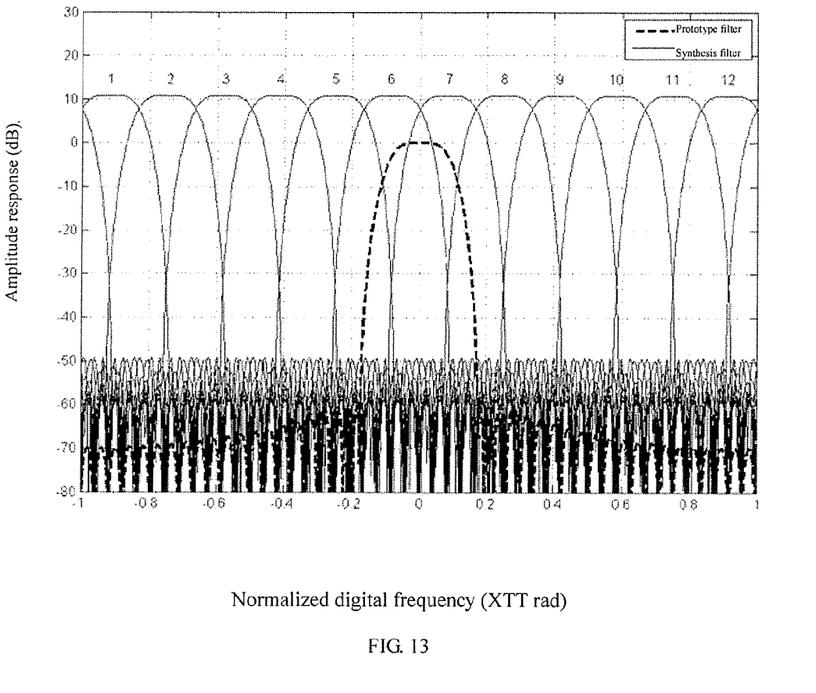
FIG. 13 is a figure of the amplitude-frequency responses of each synthesis filter and the prototype lowpass filter in Example 2.

The specific structure of the digital baseband multi-carrier modulator 6 in FIG. 2 is shown in FIG. 11, which comprises M M/2-time up-samplers 621_n, M synthesis filters 622_n and a summator 623, wherein the M/2-time up-samplers are used for increasing the symbol sampling rate by M/2 times by inserting M/2-1 zeros between two adjacent input symbols. The structure of the digital baseband multi-carrier demodulator 13 in FIG. 2 is shown in FIG. 12, which comprises M analysis filters 1321_n and M M/2-time down-samplers 1322_n, wherein the M/2-time down-samplers are used for decreasing the symbol sampling rate by M/2 times by taking out a symbol every M/2 input symbols. The time domain expressions of the synthesis filter in the $k_{th}$ branch and the analysis filter in the $k_{th}$ branch are as follows:

$$f_k(n) = \begin{cases} 0, n = 0 \\ \sqrt{M}\, h_p(n-1)\exp\left[j\frac{2\pi}{M}\left(k - \frac{M+1}{2}\right)\left(n - 1 + \frac{M+2}{4}\right)\right], \\ n = 1, 2, \ldots, N_f, \end{cases}$$

$$h_k(n) = \sqrt{M}\, h_p(N_f - 1 - n)\exp\left[-j\frac{2\pi}{M}\left(k - \frac{M+1}{2}\right)\left(N_f - 1 - n + \frac{M+2}{4}\right)\right],$$
$$n = 0, 1, \ldots, N_f - 1,$$

wherein, k=1, ..., M, $f_k(n)$ indicates the impulse response of the synthesis filter in the $k_{th}$ branch, and the length of the impulse response is $N_f$+1; $h_k(n)$ indicates the impulse response of the analysis filter in the $k_{th}$ branch, and the length of the impulse response is $N_f$; and $h_p(n)$, n=0, 1, ..., $N_f$−1 indicates a prototype lowpass filter, the length is $N_f$, and here $N_f$ is the integral multiple of M. All the synthesis filters and the analysis filters are obtained through the exponential modulation of the prototype filter; seen from the frequency domain, uniform shift is conducted on the frequency response of the prototype filter, and the shift rule is to enable the frequency response distribution of all the synthesis (analysis) filters to be in one-to-one correspondence to the divided sub-frequency bands of used frequency band, which means that, in the present embodiment, there are 12 synthesis (analysis) filters, i.e. M=12, and the frequency responses of two adjacent synthesis (analysis) filters are half-overlapped. By taking $N_f$=4*M=48, the amplitude-frequency responses of the prototype filter and the synthesis filters adopted herein are shown in FIG. 13, the amplitude-frequency responses of the analysis filters are identical with the amplitude-frequency responses of the corresponding synthesis filters; as can be seen from the figure, the frequency responses of adjacent filters are half-overlapped, therefore transition bandwidths are relatively wide, so the stopband attenuation of each filter is very large under the condition of lower order and is approximately −60 dB. The sampling frequencies of all filters are fixed as $f_s$=$W_{total}$=3.168 GHz, the carrier frequencies of the up-converter 8 and the down-converter 11 in FIG. 2 are fixed as $f_{mix}$=$f_c$=7.584 GHz, therefore signals from the digital baseband multi-carrier modulator 6 in FIG. 2 are moved onto an ultra-wideband frequency band to be used after being subjected to digital-to-analog conversion and up-conversion, wherein the frequency spectrum of the output signal of the $k_{th}$ (k=1, 2, ..., M) synthesis filter is to be moved onto the $k_{th}$ sub-frequency band. The receiving end is similar to the transmitting end, and the signal spectrum on the $k_{th}$ sub-frequency band is to be taken out by the $k_{th}$ analysis filter after being subjected to down-conversion.

There is interference between adjacent sub-frequency bands. For the purpose of simplifying the equalizer, the interference is required to be eliminated. Under the conditions of an ideal channel, it can be proved that by selecting a proper prototype filter $h_p(n)$, the system shown in FIG. 14 can be perfectly reconstructed, that is, the output of each branch is equal to the delay of the corresponding input, and the interference between adjacent branches is eliminated after the operation of taking real part. The filter banks adopted in the present embodiment satisfy the aforesaid perfect reconstruction condition, and a relatively simple equalizer can be used in the receiving end due to the property of perfect reconstruction. It should be noticed that the perfect reconstruction condition requires that the input data are real numbers, while each filter adopts complex numbers, but now real-number data are required to be transmitted on the digital sub-frequency bands corresponding to each filter, it seems that the frequency spectrum efficiency is reduced at first glance, but the frequency spectrums of adjacent two branches are half-overlapped, therefore the utilization rate of the frequency spectrums is not reduced.

Redundant information is added into input data for encoding by the channel encoder 1 at the transmitting end shown in FIG. 2 so as to improve the transmission reliability. Various encoding modes with various code rates such as convolutional code, Turbo code, LDPC code and the like can be selected. In the present embodiment, the convolutional code with the constraint length of 7 is adopted, and values like ⅓, ½, ⅝, ¾ and other values can be selected as the encoding rate according to the related index requirements.

Constellation point mapping is conducted for coded bit by the modulator 2 to obtain modulation symbols, M-PSK, M-QAM and other modulation modes can be adopted according to the related index requirements, and QPSK modulation is adopted in the present embodiment.

The modulation symbols are allocated onto each branch by the serial-to-parallel converter 3, and if certain sub-frequency bands are not used, no data are allocated onto the corresponding branches; it is assumed here that all the sub-frequency bands are used, one branch of serial data stream is converted to M(=12) branches of parallel data streams by the serial-to-parallel converter 3.

Data of each branch are divided into groups as per certain format by the framing device 4_n of each branch according to parameters of the OFDM modulation and parameters of the adopted filter banks, and synchronizing symbol sequences, channel estimation symbol sequences, frame header information symbol sequences and the like are added to form frames. Therefore, in order to illustrate the framing devices 4_n in details, the parameters of the OFDM modulator should be first illustrated.

OFDM modulation is performed for each frame data in respective branch by the OFDM modulators 5_n and comprises serial-to-parallel conversion, IFFT operation, cyclic prefix addition, parallel-to-serial conversion, etc. In the present embodiment, the number of sub-carriers of OFDM is taken as N=128, and $N_{cyc}$(=37) sample values are taken for the lengths of cyclic prefixes. In the present example, due to the adoption of the perfectly reconstructed filter banks, there is no need to insert a null sub-carrier, but because the input of the synthesis filter bank should be real numbers, the input of the OFDM modulator is constrained. Conjugate symmetric sequences are obtained through FFT operation on real-number sequences, therefore it is required that a series of sequences obtained from the data entering the OFDM modulator after being subjected to serial-to-parallel conversion are conjugate symmetric sequences. The conjugate symmetric sequences with the length N being even numbers, namely X(n), n=1, 2, . . . , N, indicate the sequences satisfying the following conditions: X(1), X(N/2+1) are real numbers, X(n)= X*(N+2−n), n=2, 3, . . . , N/2.

Figure 15:
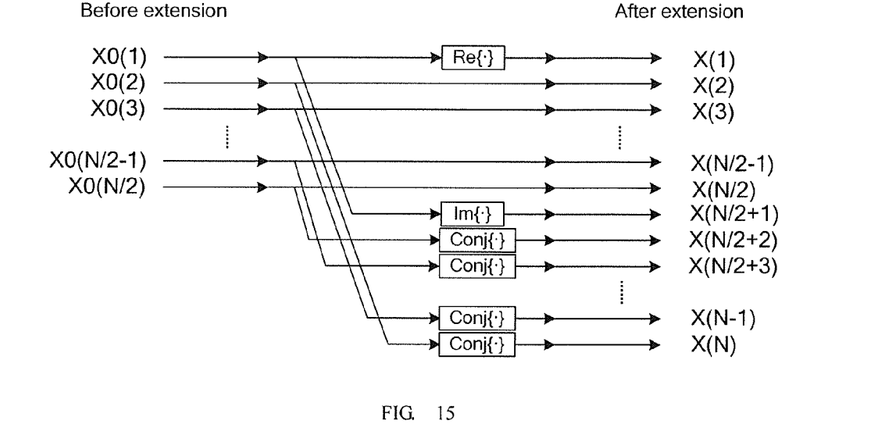
FIG. 15 is a schematic diagram for conjugate symmetric extension in Example 2.

It is assumed that each frame on each branch comprises $K_{data}$ data OFDM symbols, and $K_{data}$=100 here, therefore $N*K_{data}2$(=6400) modulation symbols are first selected by the framing devices 4_n and are divided into $K_{data}$(=100) groups by the framing devices 4_n, each group comprises N/2(=64) modulation symbols, and then conjugate symmetric extension is performed for each group of symbols, to extend 64 symbols into conjugate symmetric sequences containing 128 symbols, and the schematic diagram for conjugate symmetric extension is shown in FIG. 15. After data reduction, a plurality of synchronizing symbols, channel estimation symbols and frame header information symbols should be inserted in front of data sequences by the framing devices 4_n, and these symbol sequences also have conjugate symmetric property. Finally, the framing device 4_n output a frame with the length $(K_{sync}+K_{est}+K_{header}+K_{data})$ *N, wherein $K_{sync}$, $K_{est}$, $K_{header}$ and $K_{data}$ are respectively the numbers of OFDM symbols contained in the synchronizing sequences, channel estimation sequences, frame header information sequences and data sequences.

Symbols obtained through OFDM modulation of each frame data are modulated for the second time by the digital baseband multi-carrier modulator 6, so that all branches of baseband data are modulated onto the corresponding digital sub-frequency bands and are combined together to obtain digital baseband signals of the entire radio-frequency band signal. Digital signals are converted into analog baseband signals by the digital-to-analog converter 7; and the analog baseband signals are moved to the ultra-wideband radio-frequency range to be used by the up-converter 8 and are sent via the antenna 9, therefore sending signals with double-layer carrier are obtained.

The Signals in the air are received by the receiving antenna 10 at the receiving end in FIG. 2, and radio-frequency signals are moved to the baseband through the down-converter 11 and are converted into digital baseband signals through the analog-to-digital converter 12.

The abovementioned baseband signals are decomposed by the digital baseband multi-carrier demodulator 13, signals of corresponding sub-frequency bands are taken out and are converted onto the baseband with lower sampling rate through down-sampling, so as to obtain multi-branch baseband signals corresponding to the transmitting end, each branch of signals contains all information corresponding to signals of the transmitting end and meanwhile is influenced by the channel and interfered by the adjacent branch signals.

OFDM demodulation is carried out for each branch of baseband signals through the OFDM demodulators 14_n and specifically comprises serial-to-parallel conversion, cyclic prefix removal, FFT operation, etc.

Figure 14:
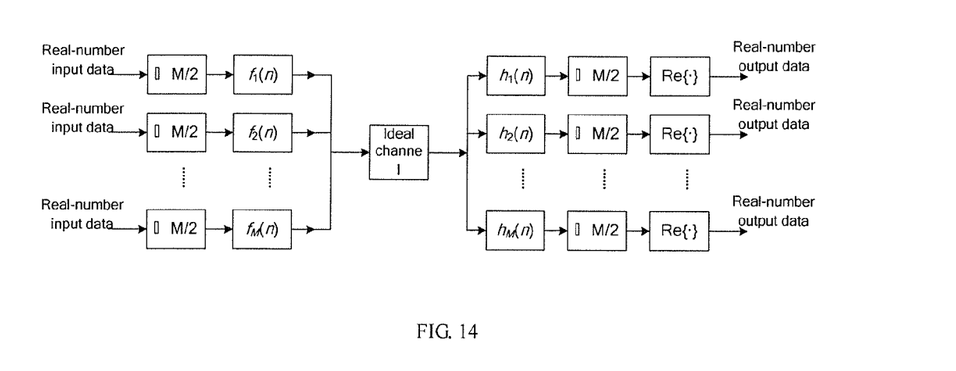
FIG. 14 is a filter bank system with entire reconstruction property.
Figure 16:
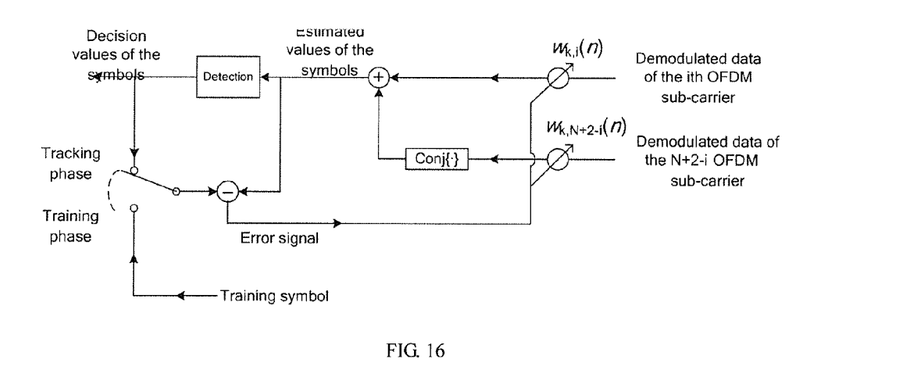
FIG. 16 is a structure block diagram of the adaptive equalizer used in the $k_{th}$ branch in Example 2.

The detectors 15_n are used for equalizing and detecting the data which have been subjected to OFDM demodulation so as to obtain estimated values of the modulation symbols at the transmitting end. There are many design schemes for the equalizer, an LMS adaptive equalizer based on the least mean square error criterion is adopted in the present embodiment, and the equalization methods adopting other adaptive algorithms are also applicable to the present invention. The equalization has two main functions: compensating non-ideal channel response and eliminating interference on adjacent branches of data. The use of OFDM enables a frequency selective fading channel to be converted into a plurality of flat fading channels, therefore the influence of the channel can be eliminated by only using a one-tap equalizer. After compensation for the channel, a perfectly reconstructed system similar to FIG. 14 is obtained, but the data now are in the frequency domain under OFDM modulation, and the operation of taking real parts is not performed. If IFFT operation is carried out for the equalized sequences, the equalized sequences will be converted onto time domains, and after taking the real parts, the time domain symbols equal to the transmitting end are obtained, and the interference of adjacent branches is eliminated; and after another FFT operation, the frequency domain symbols equal to the transmitting end are obtained, which is the very purpose that equalization wants to achieve. It is not hard to prove that the abovementioned operations can be simplified into a simple pairwise combination operation. The specific structure of the detector used for estimating and detecting the $i_{th}$ initial input symbol in a certain OFDM frequency domain symbol on the $k_{th}$ (k=1, 2, . . . , 12) branch is shown in FIG. 16, wherein i=1, 2, . . . , 64, indicating the serial number of the modulation symbols before conjugate symmetric extension. $w_{k,i}(n)$ indicates the coefficient of the equalizer used for demodulated data on the $i_{th}$ OFDM sub-carrier in the $n_{th}$ OFDM symbol period on the $k_{th}$ branch (N+2−i in FIG. 16 shall be changed into N/2+1 when i=1). The detectors 15_$n$ are composed of N/2(=64) abovementioned structures, and detected symbols are output in a serial mode.

For the detected data, multiple branches of data are combined into one branch through the parallel-to-serial converter 16, and are sent to the demodulator 17 for symbol demodulation, and finally the initial input data are recovered through the channel decoder 18.

Compared with the traditional multiband ultra-wideband, the present embodiment has the advantages as follows:

1) Very high speed rate can be achieved which is directly proportional to the used band width. If 12 sub-frequency bands are completely used and the convolutional code with r=½ code rate and the QPSK modulation are adopted, without consideration of the cyclic prefixes and the frame header information sequences, the information transmission rate is approximately $R_{bits}=r*(\log_2 4)*M/2*fs/(M/2)=fs=3.168$ Gbps;
2) Only a converter is respectively used at the transmitting end and the receiving end, therefore the radio-frequency complexity is reduced;
3) The configuration and the switching of the sub-frequency bands are completed in the digital domains, and the use of the frequency bands is flexible;
4) The adopted synthesis and analysis filters have low order and large stopband attenuation, and the shaping filter with very high order is not required to suppress out-of-band radiation, which are the advantages of the present example over example 1.

The abovementioned embodiments are two relatively basic embodiments of the present invention, and according to the contents disclosed by the invention, some similar schemes can be easily obtained and shall all fall within the protection scope of the present invention.

The invention claimed is:

1. A double-layer multi-carrier ultra-wideband wireless communication method comprising:
    dividing the frequency band for ultra-wideband communication into a plurality of sub-frequency bands, one or more sub-frequency bands being used for data transmission, and the Orthogonal Frequency Division Multiplex (OFDM) multi-carrier transmission technology is adopted in each sub-frequency band;
    at a transmitting end, allocating data symbols to be transmitted on M branches, wherein M is integer≥1, corresponding to M sub-frequency bands, and OFDM modulation is performed for the data symbols on each branch to obtain M branches of parallel data; performing digital baseband multi-carrier modulation for the M branches of parallel data, such that frequency spectrums of data on each branch are moved to digital sub-frequency bands which are in one-to-one correspondence to radio-frequency sub-frequency bands, so that digital baseband signals of radio-frequency signals to be transmitted are obtained; and converting the digital signals into analog signals through digital-to-analog (D/A) conversion and up-conversion, signal frequency spectrums are moved to the used radio-frequency ranges, and the analog signals are amplified, filtered and transmitted via an antenna, thereby completing the task of modulating the M branches of parallel data onto the M sub-frequency bands;
    at a receiving end, down-converting and analog-to-digital converting the signals so as to generate digital baseband signals which are synthesized through the data on the M sub-frequency bands; performing multi-carrier demodulation for the baseband signals, so that frequency spectrums of each sub-frequency band data are moved onto respective basebands to obtain the M branches of parallel data; and conducting OFDM demodulation, equalization and detection for each branch of data, and all branches of data are combined into one branch of data, such that the data symbols corresponding to the transmitting end are recovered,
    wherein the transmitting end comprises a channel encoder, a modulator, a serial-to-parallel converter, sub-band framing devices, OFDM modulators, a digital baseband multi-carrier modulator, a digital-to-analog converter, an up-converter, and a transmitting antenna, which are connected in sequence; and the receiving end comprises a receiving antenna, a down-converter, an analog-to-digital converter, a digital baseband multi-carrier demodulator, OFDM demodulators, detectors, a parallel-to-serial converter, a demodulator, a channel decoder, which are connected in sequence, and
    wherein the double-layer multi-carrier ultra-wideband wireless communication method is characterized in that the digital baseband multi-carrier modulator is realized by adopting a synthesis filter bank which comprises M up-samplers, M digital bandpass filters and summator, wherein M is the number of sub-frequency bands, and the divisions of frequency ranges occupied by pass bands and transition bands of the digital bandpass filters are in one-to-one correspondence to the divisions of the sub-frequency bands in radio-frequency bands; and the digital baseband multi-carrier modulation comprises the following steps: performing up-sampling for each branch of data which have been subjected to OFDM modulation by inserting a plurality of zeros between two adjacent data symbols, thereby compressing frequency spectrums of the original signals and generating a series of mirror image frequency spectrums; passing the up-sampled data through the digital bandpass filters of the respective branches, and reserving frequency spectrums positioned in the digital sub-frequency bands corresponding to the respective branches; and summarizing the M branches of data and synthesizing into digital baseband signals of the radio-frequency signals to be transmitted.

2. The double-layer multi-carrier ultra-wideband wireless communication method according to claim 1, characterized in that the task of modulating the M branches, wherein M is integer≥1, of parallel data onto the M sub-frequency bands is completed through the following steps:

generating the digital baseband signals of the radio-frequency signals to be transmitted containing all the sub-frequency bands; and D/A converting and single up-converting the digital baseband signals.

3. A double-layer multi-carrier ultra-wideband wireless communication method comprising:

dividing the frequency band for ultra-wideband communication into a plurality of sub-frequency bands, one or more sub-frequency bands being used for data transmission, and the Orthogonal Frequency Division Multiplex (OFDM) multi-carrier transmission technology is adopted in each sub-frequency band;

at a transmitting end, allocating data symbols to be transmitted on M branches, wherein M is integer≥1, corresponding to M sub-frequency bands, and OFDM modulation is performed for the data symbols on each branch to obtain M branches of parallel data; performing digital baseband multi-carrier modulation for the M branches of parallel data, such that frequency spectrums of data on each branch are moved to digital sub-frequency bands which are in one-to-one correspondence to radio-frequency sub-frequency bands, so that digital baseband signals of radio-frequency signals to be transmitted are obtained; and converting the digital signals into analog signals through digital-to-analog (D/A) conversion and up-conversion, signal frequency spectrums are moved to the used radio-frequency ranges, and the analog signals are amplified, filtered and transmitted via an antenna, thereby completing the task of modulating the M branches of parallel data onto the M sub-frequency bands;

at a receiving end, down-converting and analog-to-digital converting the signals so as to generate digital baseband signals which are synthesized through the data on the M sub-frequency bands; performing multi-carrier demodulation for the baseband signals, so that frequency spectrums of each sub-frequency band data are moved onto respective basebands to obtain the M branches of parallel data; and conducting OFDM demodulation, equalization and detection for each branch of data, and all branches of data are combined into one branch of data, such that the data symbols corresponding to the transmitting end are recovered, wherein the transmitting end comprises a channel encoder, a modulator, a serial-to-parallel converter, sub-band framing, devices, OFDM modulators, a digital baseband multi-carrier modulator, a digital-to-analog converter, an up-converter, and a transmitting antenna, which are connected in sequence; and the receiving end comprises a receiving antenna, a down-converter, an analog-to-digital converter, a digital baseband multi-carrier demodulator, OFDM demodulators, detectors, a parallel-to-serial converter, a demodulator, a channel decoder, which are connected in sequence, and wherein the double-layer multi-carrier ultra-wideband wireless communication method is characterized in that the digital baseband multi-carrier demodulator is realized by adopting an analysis filter bank, and the analysis filter bank comprises M digital bandpass filters and M down-samplers, wherein M is the number of sub-frequency bands, and the frequency ranges of pass bands and transition bands of the above-mentioned digital bandpass filters are identical with those of the filters on the corresponding branches in the synthesis filter bank; and the digital baseband multi-carrier demodulation comprises the following steps: respectively passing the data which have been subjected to analog-to-digital conversion through the M digital bandpass filters to obtain M branches of parallel data streams; and performing down-sampling for each branch of data stream to obtain digital baseband signals of the data received by each sub-frequency band.

4. A double-layer multi-carrier ultra-wideband wireless communication method comprising:

dividing the frequency band for ultra-wideband communication into a plurality of sub-frequency bands, one or more sub-frequency bands being used for data transmission, and the Orthogonal Frequency Division Multiplex (OFDM) multi-carrier transmission technology is adopted in each sub-frequency band;

at a transmitting end, allocating data symbols to be transmitted on M branches, wherein M is integer≥1, corresponding to M sub-frequency bands, and OFDM modulation is performed for the data symbols on each branch to obtain M branches of parallel data; performing digital baseband multi-carrier modulation for the M branches of parallel data, such that frequency spectrums of data on each branch are moved to digital sub-frequency bands which are in one-to-one correspondence to radio-frequency sub-frequency bands, so that digital baseband signals of radio-frequency signals to be transmitted are obtained; and converting the digital signals into analog signals through digital-to-analog (D/A) conversion and up-conversion, signal frequency spectrums are moved to the used radio-frequency ranges, and the analog signals are amplified, filtered and transmitted via an antenna, thereby, completing the task of modulating the M branches of parallel data onto the M sub-frequency bands;

at a receiving end, down-converting and analog-to-digital converting the signals so as to generate digital baseband signals which are synthesized through the data on the M sub-frequency bands; performing multi-carrier demodulation for the baseband signals, so that frequency spectrums of each sub-frequency band data are moved onto respective basebands to obtain the M branches of parallel data; and conducting OFDM demodulation, equalization and detection for each branch of data, and all branches of data are combined into one branch of data, such that the data symbols corresponding to the transmitting end are recovered, wherein the transmitting end comprises a channel encoder, a modulator, a serial-to-parallel converter, sub-band framing devices, OFDM modulators, a digital baseband multi-carrier modulator, a digital-to-analog converter, an up-converter, and a transmitting antenna, which are connected in sequence; and the receiving end comprises a receiving antenna, a down-converter, an analog-to-digital converter, a; digital, baseband multi-carrier demodulator, OFDM demodulators, detectors, a parallel-to-serial converter, a demodulator, a channel decoder, which are connected in sequence, and wherein the double-layer multi-carrier ultra-wideband wireless communication method is characterized in that the parallel data which have been subjected to OFDM demodulation are equalized and detected by the detectors so as to eliminate the influence on the channel and the interference among the sub-frequency bands; a single-tap frequency domain equalizer based on the zero-forcing (ZF) criterion or the least mean square error (LMSE) criterion is adopted for equalization, so as to eliminate non-ideal properties of the channel, wherein the channel refers to an equivalent channel from the output of the digital baseband multi-carrier modulator to the input of the digital baseband multi-carrier demodulator; and the equalizer comprises an equalizer with fixed tap coefficient or an adaptive equalizer.

* * * * *